INVENTOR
A. HEINZ
BY [signature]
ATTORNEY

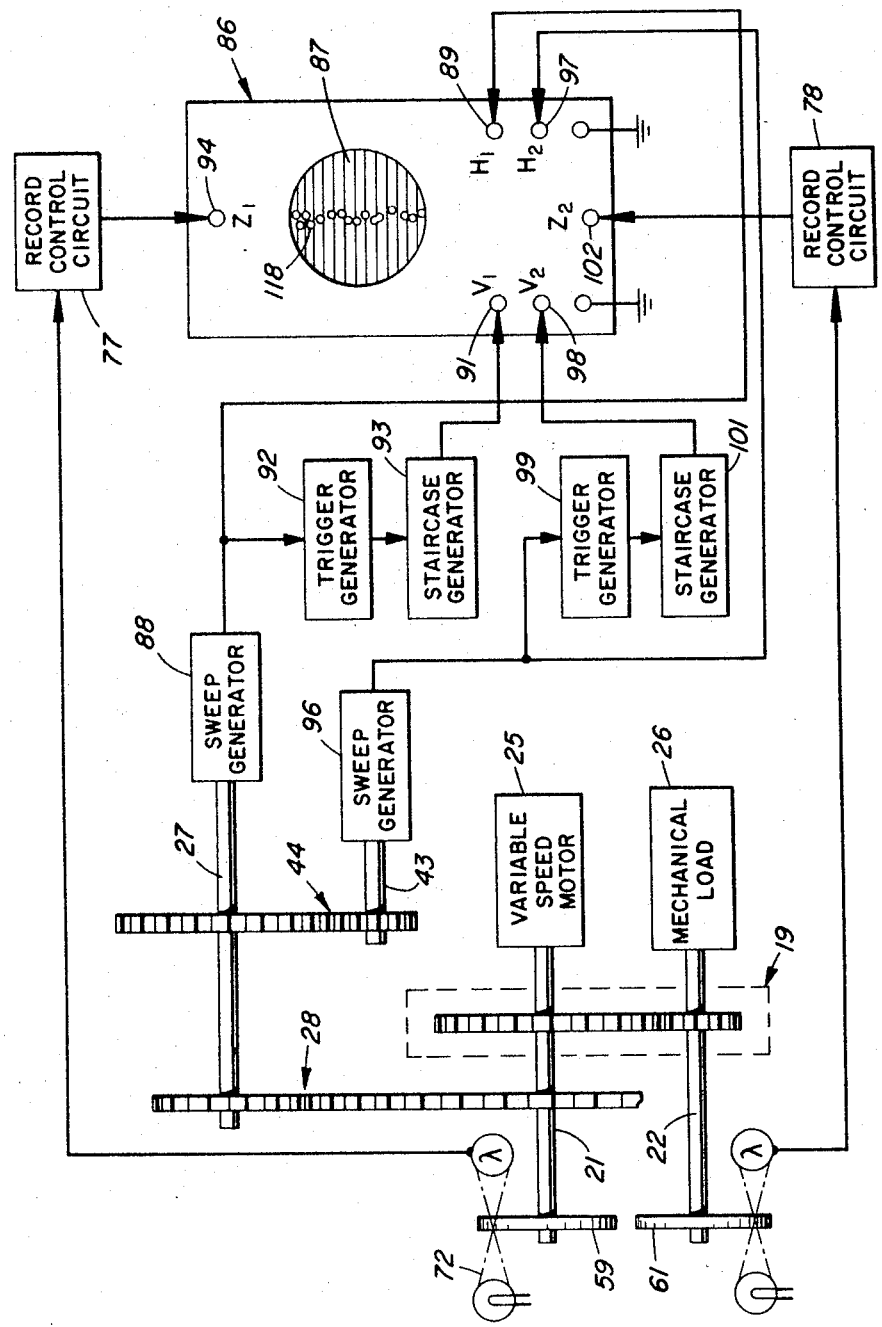

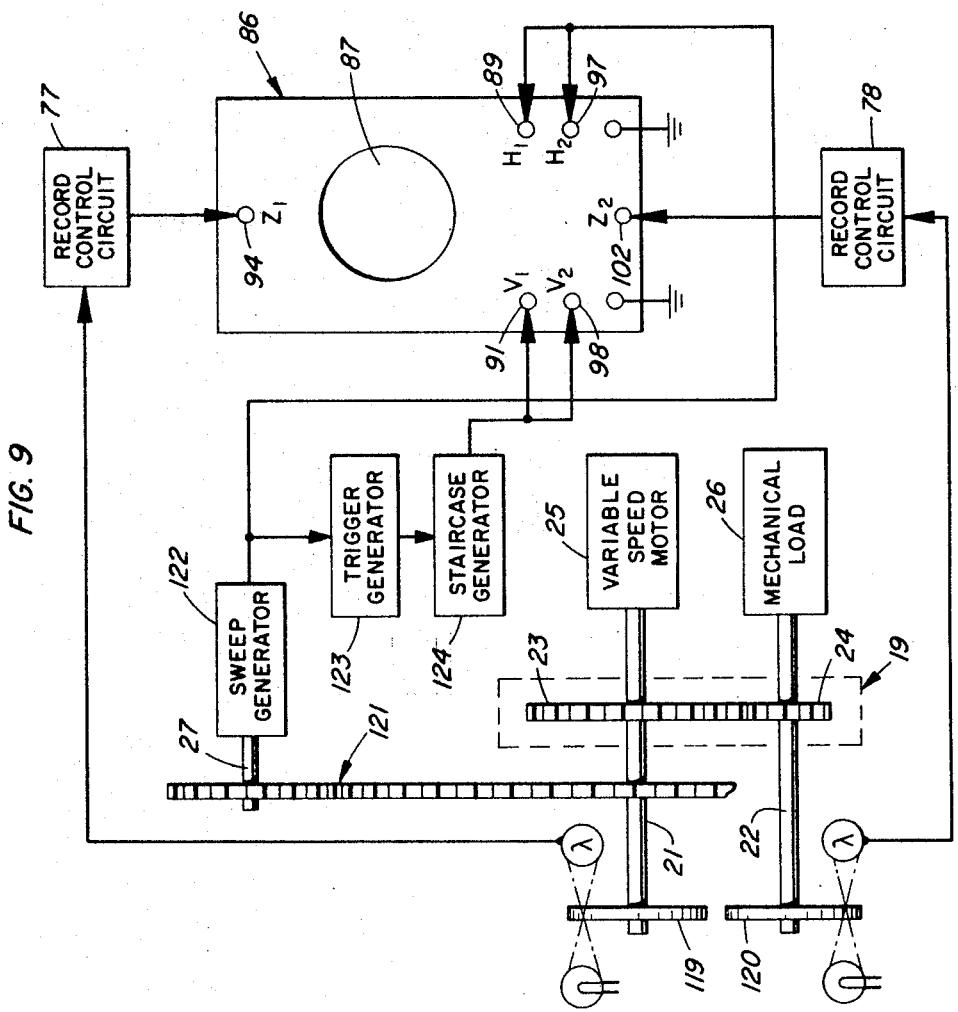

United States Patent Office  3,462,607
Patented Aug. 19, 1969

3,462,607
METHOD AND APPARATUS FOR DYNAMICALLY CHECKING ROTATIONAL COUPLINGS USING PATTERN COMPARISON
Alfred Heinz, Flemington, N.J., assignor to Western Electric Company Incorporated, New York, N.Y., a corporation of New York
Filed Mar. 24, 1967, Ser. No. 625,668
Int. Cl. H01j 39/12
U.S. Cl. 250—215          8 Claims

ABSTRACT OF THE DISCLOSURE

A pair of visual patterns indicative of the input and output motions, respectively, of a rotatable coupling such as a gear train or clutch are developed and compared to determine the overall angular accuracy of the coupling. One pattern is developed in synchronism with successive predetermined angular increments of the input motion, while the other pattern is developed in synchronism with successive increments of output motion exactly corresponding to the predeterment increments of input motion.

Background of the invention

In many industrial applications, it is common to employ a suitable motion-transmitting drive coupling to produce an output motion which is related to a prescribed input motion in some desired manner. Illustratively, it is often desired to employ a rotational coupling, such as a gear train or clutch, to produce an angular output which is a desired function of an angular input. Ideally, each increment of angular rotation of the input of such a coupling will always effect an exactly corresponding increment of angular rotation of its output under all operation speed and load conditions. In actual practice, misalignments and imperfections in the rotational coupling preclude such a perfect correspondence between angular input and angular output. Thus, when a mated gear pair is employed as the rotational coupling, any irregularity in the mating surfaces of the gear members (e.g., eccentricity of the gears, imprecise spacing between successive teeth around the gear periphery, defects in the surfaces of the teeth) may result in imperfect input-output correspondence or, as it will be referred to herein, imperfect "angular accuracy."

In many cases it is important to quickly ascertain, under actual operating conditions, the degree of departure of such couplings from perfect angular accuracy for the purpose of (a) predicting the overall performance of the system in which they are incorporated and (b) in appropriate cases, physically modifying the coupling to correct its inaccuracy.

One technique which has been satisfactorily used in connection with other types of measurements on rotatable members employs optical apparatus. In particular, such a technique has been used to rapidly determine, under controlled conditions, the regularity with which a single rotating member traverses through successive equal angular increments.

The general problem treated in this case is to provide a rapid optical technique for monitoring the effective transmission of motion through a drive coupling. More particularly, the problem is to provide such a technique for monitoring the angular accuracy of a rotational coupling on a dynamic basis, i.e., under actual operating conditions of the coupling, so that the effects of varying angular speed and load can be ascertained.

Summary of the invention

One solution to this problem is provided by the method and apparatus of the instant invention which, for the sake of brevity, is described herein in connection with rotatable couplings only. The instantaneous angular positions of the input and output of a rotatable coupling, which ideally has a predetermined motion-changing characteristic, are successively sampled as the coupling rotates under selected speed and load conditions. The sampling is accomplished by generating trains of electrical pulses in synchronism with successive traversals of the input and output, respectively, through predetermined angular increments related to the desired motion-changing characteristic. The trains are employed to generate a pair of patterns, each of which corresponds to the time variations within the associated train. The conformity of the patterns is indicative of the angular accuracy of the coupling.

In an illustrative embodiment of the invention, a pair of generally transparent circular standards, each having opaque radial graduations around its periphery, are affixed to the input and output of the coupling, respectively. One of the coupling members is rotated by an external drive system to provide relative rotation between the standards and a pair of fixed light beams individually associated with the respective standards. The light beams are arranged to illuminate narrow portions of the peripheral regions on the respective standards. Each of the members has associated therewith a display medium, which may take the form of a so-called "watch-rate" recorder. When this form of display is employed, a pair of helical anvils are individually rotated over moving pressure-sensitive recording sheets in timed relation to the rotation of the respective shafts. The successions of interruptions of the respective beams by the graduations on the standards are converted to corresponding successions of output pulses by a pair of photodetectors. The pulses from the photodetectors are respectively applied to a pair of printer bars individually associated with, and disposed on the opposite side of the moving tape with respect to, the anvils. Each printer bar squeezes the tape against the periphery of the corresponding anvil to form a mark in response to each pulse applied thereto. Each succession of pulses is therefore converted by the associated printer bar to a corresponding pattern of marks on the tape.

Provision is additionally made for an integral number of rotations of each helical anvil to occur between successive graduations on the associated standard so that if the angular accuracy of the coupling is perfect, the patterns of marks generated at the input and output of the coupling will coincide. In general, the degree of correspondence of the patterns is proportional to the angular accuracy of the coupling under the dynamic conditions of speed and load to which it is then subjected.

The display medium may alternatively take the form of an electron beam recorder utilizing intensity-modulated traces on the screen of a cathode ray oscilloscope. In this case, the rotation of the respective members generate a succession of vertically displaced horizontal sweeps on the screen in timed relation to the rotation of the associated members. The patterns of samples corresponding to each succession of interruptions of the respective light beams by the associated standards are manifested by locally brightened or darkened spots on the screen.

Brief description of the drawing

The nature of the present invention and its various advantages will appear more fully from a consideration of the following detailed description taken in connection with the appended drawing, in which:

FIG. 4 is a diagrammatic representation, similar to FIG. 1, but employing a first alternative form of display system;

FIGS. 6, 7 and 8 are pictorial diagrams of waveforms existing at different points on the arrangement of FIG. 4;

FIG. 9 is a diagrammatic representation of a modified form of the arrangement of FIG. 4.

Detailed description

Figure 1:
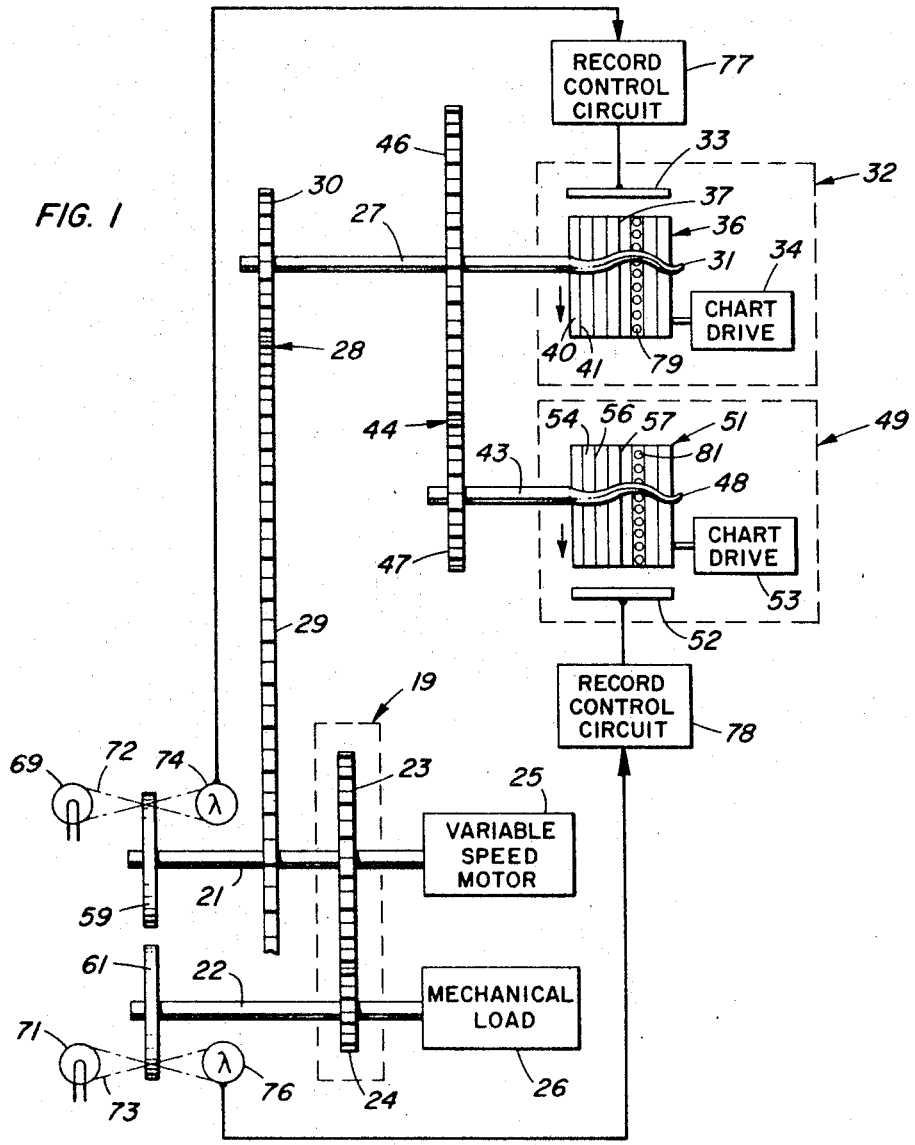
FIG. 1 is a diagrammatic representation of an arrangement for monitoring the angular accuracy of a pair of rotationally coupled members in accordance with the invention.

Referring in more detail to the drawing, FIG. 1 schematically depicts a first illustrative embodiment of the invention. The angular accuracy of a rotational coupling 19 between a pair of shafts 21 and 22, which will hereinafter sometimes be referred to as the "reference shaft 21" and the "test shaft 22," is to be monitored. The coupling 19 is illustrated and hereinafter described as a pair of mated gears 23 and 24, although it will be evident that a clutch or any other type of link mechanical or otherwise, suitable for rotational coupling between the shafts 21 and 23, may be employed.

The reference shaft 21 and the test shaft 22 respectively carry the gears 23 and 24 in engaged relation. It is assumed that the gear ratio, N, of the gears 23 and 24 is such that the shaft 22 will nominally rotate at N times the angular speed of the shaft 21 when the latter is externally driven. The reference shaft 21 is coupled to the output of an electric motor 25, which may be operated at selectable speeds to simulate various operating conditions for the shafts 21 and 22. The test shaft 22 is coupled to a variable mechanical load 26 of any suitable type which may be used to simulate the different loading conditions to which the rotational coupling 19 may be subjected. The reference shaft 21 is coupled to a shaft 27 through a first precision gear train 28, which is shown schematically as a pair of engaged gears 29 and 30 individually mounted on the shafts 21 and 27. For purposes of illustration, it is assumed that the gear ratio of the first precision gear train 28 is such that the rotation of the motor 25 at a given angular speed will rotate the shaft 27 at a much higher angular speed, as described below. The shaft 27 terminates in a helical anvil member 31 (hereinafter called "printing spiral 31").

Figure 2:
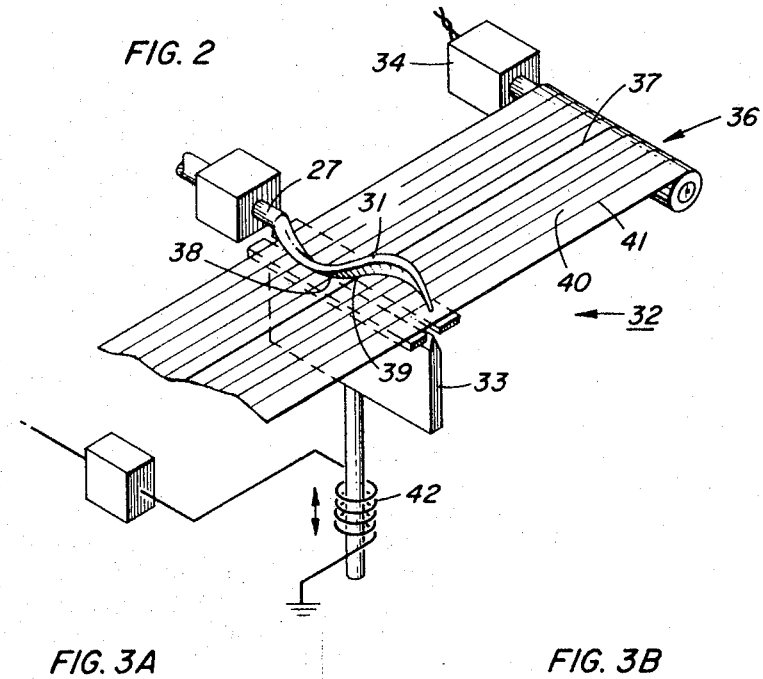
FIG. 2 is a perspective view of a watch-rate type recorder suitable for use in the arrangement of FIG. 1.

As shown best in FIG. 2, the printing spiral 31 is associated with a recorder 32, which is illustratively a model G–57 Watch Rate Recorder manufactured by the American Time Products Division of the Bulova Watch Company. The recorder 32 is provided with an electromagnetically actuated printer bar 33, and with a chart drive 34 for cyclically advancing a first strip 36 of pressure-sensitive recording paper between the printing spiral 31 and the printer bar 33 in a direction parallel to a longitudinal datum line 37 of the strip 36. The printing spiral 31 has a helical peripheral surface 38 which is adapted to advance transversely across the strip 36 as the printing spiral 31 is rotated so that one point only of the surface 38 is in contact with the strip 36 at any one time. The design of the printing spiral 31 is such that a portion 39 of the peripheral surface 38 is in alignment with the datum line 37 for a predetermined angular position of the printing spiral 31 and thus of the shaft 27.

The strip 36 is provided with a plurality of transversely disposed spaces 40—40 defined by a corresponding plurality of graduation lines 41—41 disposed parallel to the datum line 37.

The printer bar 33 is advanced in an upward direction as viewed in FIG. 2 in response to an actuating pulse applied to an associated coil 42 to compress the strip 36 against the portion of the peripheral surface 38 that is then in contact with the strip 36. A mark (not shown) is thus impressed on the strip 36 at this point of engagement.

Referring again to FIG. 1, the shaft 27 is also coupled to a shaft 43 through a second precision gear train 44, which is schematically shown as a pair of gears 46 and 47 individually mounted on the shafts 27 and 43. The shaft 43 is terminated in a printing spiral 48 of a second recorder 49, which may be identical to the recorder 32. The recorder 49 is provided with a second recording strip 51, a second printer bar 52, and a second chart drive 53, all of which cooperate with the second printing spiral 48 in a manner similar to the corresponding elements of the recorder 32. The second strip 57 is provided with a plurality of transverse spaces 54—54 defined by a corresponding plurality of graduation lines 56—56 that are disposed parallel to a datum line 57 of the strip 51. The gear ratio of the train 44 is such that the angular speed of the shaft 43 relative to that of the shaft 27 will bear the same ratio (e.g., N to 1) as that of the desired angular speed of the test shaft 22 relative to the reference shaft 21.

Figure 3A:
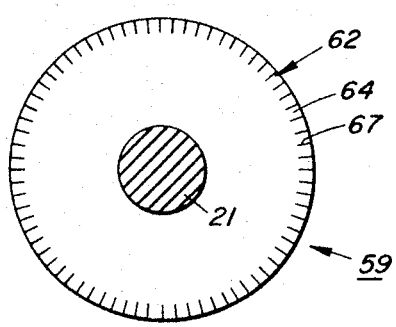
FIGS. 3A and 3B are individual pictorial representations of a pair of circular standards suitable for use in the arrangement of FIG. 1.
Figure 3B:
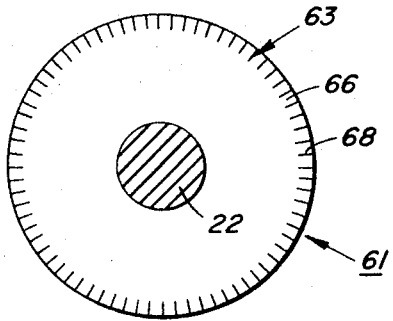

A pair of circular, generally transparent standards 59 and 61 are mounted on the reference shaft 21 and the test shaft 22, respectively. As shown best in FIGS. 3A and 3B, the peripheral regions of the standards are defined by an identical pair of photographed or etched patterns 62 and 63 that are respectively divided into a plurality of light transmissive equiangular sectors 64—64 and 66—66 separated by a corresponding number of opaque, radially disposed graduations 67—67 and 68—68. As shown in FIG. 1, the faces of the standards 59 and 61 are disposed substantially perpendicular to the longitudinal axes of their respective shafts.

A pair of light sources 69 and 71 are proivded on one side of the respective standards 59 and 61 for individually projecting a pair of focused light beams 72 and 73 toward narrow portions of the peripheral regions of the standards. Preferably, the anglar width of each of the focused beams 72 and 73 is less than the angular spacing between the successive graduations 67—67 and 68—68 (FIGS. 3A and 3B), respectively, on their associated standards to assure adequate resolution.

A pair of light sensing heads 74 and 76 (FIG. 1), are respectively disposed on the sides of the circular standards 59 and 61 opposite from the light sources 69 and 71. The heads 74 and 76 are aligned with the respective optical axes of the light sources 69 and 71 to receive the focused beams 72 and 73 in the absence of an intervening opaque graduation of the standard 59 and an opaque graduation of the standard 61, respectively. In a manner well known in the art, each of the heads 74 and 76 is adapted to generate a pulse each time the associated beam is interrupted. The pulses from each of the heads 74 and 76 are individually processed in a pair of record control circuits 77 and 78, the outputs of which are coupled to and arranged to actuate the coils associated with the printer bars 33 and 52. The light sources 69 and 71, the light sensing heads 74 and 76, and the record control circuits 77 and 78 may be constructed in the manner described in U.S. Patent No. 3,274,391, issued to the applicant on Sept. 20, 1966 and assigned to the assignee of the present invention.

The gear ratio of the first gear train 28 is chosen such that during the interruption of the light beam 72 by the successive graduations 67—67 (FIG. 3A) of the standard 59, an integral number of revolutions of the printing spiral 31 (FIG. 1) will occur during the angular interval between successive ones of the graduations of the standard 59. Also, it will be observed that the relative speeds of the printing spirals 31 and 48 correspond to the nominal relative speeds of the reference and test shafts 21 and 22 because of the gear ratio selected for the second gear train 44. As a result, the above-mentioned gear ratio of the train 28 will also assure that during the interception of the beam 73 by successive ones of the graduations 68—68 (FIG. 3B) of the test standard 61, an integral number of revolutions of the second printing spiral 48 (FIG. 1) will also occur in the angular interval between successive ones of the graduations of the standard 61.

In the operation of the arrangement shown in FIGS. 1–3B, the rotation of the motor 25 at a selected speed (which will hereinafter be assumed to remain constant during a given monitoring procedure) rotates the coupled reference and test shafts 21 and 22 at relative angular speeds nominally bearing the ratio of 1 to N. The resulting rotation of the standards 59 and 61 cause the stationary light beams 72 and 73 to be individually interrupted by the interposed radial graduations 67—67 and 68—68 of the associated standards. The resulting trains of electrical pulses at the outputs of the record control circuits 77 and 78 cause the printer bars 33 and 52 to individually mark the strips 36 and 51 at points defined by the then-adjacent portions of the corresponding printing spirals 31 and 48.

The rotation of the motor 25 will cause the equally spaced graduations 67—67 (FIG. 3A) on the standard 59 to interrupt the associated optical beam 72 (FIG. 1) at equally timed intervals. If the angular accuracy of the coupling of the first gear train 28 is perfect, the tape-contacting portion of the peripheral surface of the printing spiral 31 will always be aligned with the same region of the strip 36 each time the beam 72 is interrupted. Since the strip 36 is advanced by the chart drive 34 as the printing spiral 31 is rotated, the electrical pulses generated by the record control circuit 77 cause the printer bar 33 to form on the strip 36 a series of spaced marks 79—79. The marks 79—79 define a straight line parallel to the graduation lines 41—41.

On the other hand, if the angular accuracy of the coupling of the first gear train 28 is not perfect, the radial graduations 67—67 on the standard 59 will not interrupt the light beam 72 simultaneously with the alignment of the desired portion of the printing spiral 31. In such a case, the light beam 72 is interrupted (and the output signal of the record control circuit 77 is generated) either before or after the contacting portion of the peripheral surface is so aligned. The resulting actuation of the printer bar 33 causes marks to be produced in areas or sections of the tape 36 that are displaced transversely from the straight line defined by the marks 79—79. The direction and magnitude of such deviations is a function of the deviations from perfect angular accuracy of the first gear train 28.

In like manner, the interruptions of the light beam 73 by the graduations 68 (FIG. 3B) on the standard 61 will be accompanied by the generation of a corresponding series of marks 81—81 (FIG. 1) on the strip 51. These marks will be affixed by the printer bar 52 when actuated by the light sensing head 76 and the record control circuit 78 in a manner identical to the interaction of the corresponding reference shaft components described above. Thus, the pattern of marks printed on the strip 51 represents the combined effect of angular inaccuracies of the rotational couplings in the drive system and the angular inaccuracy of the rotational coupling 19 under test, i.e., the gear pair 23 and 24. Since the gear ratio of the train 44 corresponds exactly to the desired gear ratio of the gear pair 23 and 24, the pattern of marks 81—81 printed by the printer bar 52 on the strip 51 will correspond to the pattern of marks 79—79 on the strip 36 if the angular accuracy of the gear pair 23 and 24 is perfect. The direction and amplitude of deviations of the mark pattern printed on the strip 51 with respect to that printed on the strip 36 are therefore indicative of the angular inaccuracy of the gear pair 23 and 24 alone, irrespective of the precision of the remainder of the rotating system shown in FIG. 1.

In some instances, operation of the system of FIGS. 1–3B at high rotational speeds may cause excess mechanical wear of one or both of the printing spirals 31 and 48, particularly when the gear ratio of the coupling 19 is large. In such a case, a modified form of the invention may be employed wherein an electron beam recorder may be substituted for the watch-rate recorders 32 and 49 of FIG. 1.

An illustrative electron beam recorder of this type is shown in the modified arrangement of FIG. 4, wherein elements corresponding to those of FIG. 1 have been given corresponding reference numerals. The recorder comprises a cathode ray oscilloscope 86, which for simplicity is assumed to be of the dual-trace type. However, it will be evident to those skilled in the art that the oscilloscope can also be of the single-trace type which employs an external, conventional high speed switching arrangement to accommodate two sets of input data applied thereto so that the eye of the observer will preceive the alternately switched traces as if they occurred simultaneously.

The dual-trace oscilloscope 86 is provided, in a manned well known in the art, with vertical (V), horizontal (H) and intensity modulation (Z) inputs for each trace. The oscilloscope 86 is further provided with a display screen 87.

In order to generate a first trace on the screen 87, the output of the shaft 27 is coupled to the input of a first optically excited sweep generator 88 whose construction is described below. The electrical output of the generator 88 is coupled directly to a first horizontal input 89 of the oscilloscope 86 and to a first vertical input 91 thereof through a first trigger generator 92 and a first staircase generator 93. The output of the record control circuit 77 is routed to a first Z-axis input 94 of the oscilloscope 86.

In order to generate a second trace on the screen 87, the output of the shaft 43 is coupled to the input of a second optically excited sweep generator 96. The electrical output of the generator 96 is coupled directly to a second horizontal input 97 of the oscilloscope 86 and to a second vertical input 98 thereof through a second trigger generator 99 and a second staircase generator 101. The output of the record control circuit 78 is routed to a second Z-axis input 102 of the oscilloscope 86. The components 96, 99 and 101 may be respectively identical to the components 88, 92 and 93.

Figure 5:
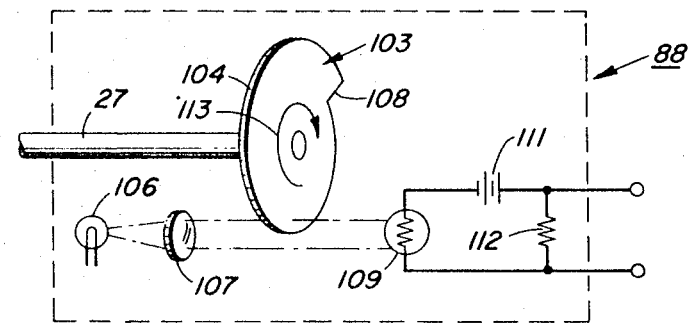
FIG. 5 is a pictorial representation of an optically excited sweep generator suitable for use in the display system of FIG. 4.

The identical first and second sweep generators 88 and 96 may illustratively take the form described, e.g., in U.S. Patent No. 2,043,800, issued to A. Karolus on June 9, 1936. A simplified version of the design is shown in FIG. 5. The shaft 27 terminates in an opaque, rotatable timing disk 103. The periphery of the disk 103 is defined by a discontinuous spiral region 104. A light source 106 is positioned in front of the timing disk 103 for illuminating the peripheral region 104 through a collimating lens 107. The quantity of light that is intercepted by the disk 103 may be varied by rotation of the peripheral region 104. The discontinuity between the smallest and the largest radius of the peripheral region 104 is bridged by an end region 108. A photosensor 109, of the type whose internal resistance decreases with increasing amounts of light incident thereon, is positioned in back of the disk 103 in alignment with the source 106 and the lens 107. Excitation bias for the photosensor 109 is applied from a DC source 111 through a load resistor 112.

The output of the generator 88 is taken across the load resistor 112.

In operation of the device of FIG. 5, it is assumed that (a) the timing disk 103 is so designed that the large radius portion in the vicinity of the end region 108 is initially aligned with the source 106, so that minimum light reaches the photosensor 109; and (b) the timing disk 103 is rotated in the direction shown by an arrow 113. In such a case, the amount of light from the source 106 impinging upon the photosensor 109 successively increases until the disk 103 has made a 360° rotation. At that time the amount of light reaching the photosensor 109 suddenly decreases again to its minimum. The resulting excitation of the photosensor 109 yields a voltage waveform 114 (FIG. 6) across the resistor 112 (FIG. 5) that varies in accordance with the light variation of the photosensor 109. By properly designing the spiral region 104 of the disk 103, the positive-slope portion of the waveform 114 (FIG. 6) may be made substantially linear. The period T of the resulting waveform 114 is equivalent to the time necessary for the shaft 27 (FIG. 5), and thus the disk 103, to make one complete revolution about its axis. As a result, one period T of the waveform 114 (FIG. 6) is equivalent to one cycle of rotation of the first printing spiral 31 in FIG. 1.

It will be understood that other common types of optically excited sweep generators, such as light-sensitive potentiometers, may be employed with like results in place of the arrangement of FIG. 5.

The trigger generators 92 and 99 (FIG. 4) are adapted to yield a succession of synchronizing pulses 116 (FIG. 7) occurring at the recurrence period T of the generators 88 and 96 (FIG. 4) and appearing at the beginning of each cycle of the waveform 114 (FIG. 6). The trigger generators 92 and 99 (FIG. 4) may be of any commonly known type, such as a monostable multivibrator triggered by the steep trailing edge of the waveform 114 (FIG. 6).

The output voltage of the staircase generators 93 and 101 (FIG. 4), which may also be of any type well-known in the art, has a recurrence period $T_A$ (FIG. 8) equivalent to an integral number of periods T of the waveform 114 (FIG. 6) and is manifested by a succession of constant voltage steps 117 (FIG. 8) over the period $T_A$. Each increment between successive steps 117 is triggered at the recurrence period T by the pulses 116 (FIG. 7) from the trigger generators 92 and 99 (FIG. 4), respectively. At the end of each period $T_A$, the staircase generators 93 and 101 are reset to zero in any suitable manner.

In the operation of the arrangement shown in FIGS. 4–8, the motor 25 (FIG. 4) rotates the shaft 27 through the first gear train 28, whose ratio is assumed to be numerically equal to M×G, where M is an integer and G is the number of graduations on the reference standard 59. The shaft 43, in turn, is rotated by the shaft 27 through the second gear train 44. The rotation of the shaft 27 is translated, point by point, into the movement of a first cathode ray spot on the screen 87 of the oscilloscope 86 in the horizontal direction under the control of the first sweep generator 88. The resulting first trace on the screen 87 remains vertically stationary during each cycle of rotation of the shaft 27 (i.e., during each period T of the waveform 114 of FIG. 6) because of the invariant voltage step 117 (FIG. 8) applied to the first vertical input 91 (FIG. 4) of the oscilloscope 86 during this period. At the conclusion of each cycle of rotation of the shaft 27, an output pulse 116 (FIG. 7) from the trigger generator 92 (FIG. 4) causes the staircase waveform 117 (FIG. 8) to suddenly increase to its next constant voltage step, which in turn will be applied to the vertical input 91 (FIG. 4) until the start of the next succeeding cycle of rotation of the shaft 27. Thus, at the start of each cycle of rotation of the last-mentioned shaft, the first spot advances by a predetermined increment in a constant vertical direction and remains vertically stationary for the remainder of that cycle. By contrast, the linearly increasing portion of the waveform 114 (FIG. 6) causes the first spot to move successively from left to right across the screen during each cycle. This results in a raster similar to that of a two-dimensional TV sweep being generated on the screen 87 of FIG. 4.

In order to monitor the accuracy of the rotational coupling 19 with the arrangement of FIGS. 4–8, the brightness of the first spot on the screen 87 (FIG. 4) is intensity-modulated by the output pulses from the record control circuit 77. These pulses are applied to the first Z-axis input 94 of the oscilloscope 86. It will be recalled that such pulses occur when the light beam 72 is interrupted by the peripheral graduations on the first standard 59. The pattern on the screen 87 will appear as a succession of contrasting spots 118, which are assumed to be relatively bright although it will be apparent that the spots may also be made relatively dark. The spots 118 will define a substantially vertical line on the screen 87 if the gear train 28 has perfect angular accuracy. Any inaccuracies in the gear train 28 will cause the local brightening of the pattern to occur at different times on each horizontal sweep so that the bright spots 118 on the screen are relatively displaced so as to no longer define a substantially vertical line.

It will be evident that the rotation of the shaft 43 by the shaft 27 through the gear train 44 will, with the aid of the components 78, 96, 99 and 101, result in a second pattern on the screen 87, which pattern is also locally brightened (in a manner not shown).

The correspondence of the two patterns on the screen 87 will, by analogy to the mark patterns on the recorders 32 and 49 of FIG. 1, be an indication of the angular accuracy of the rotational coupling 19 under test.

FIG. 9 illustrates a modification of the arrangement of FIGS. 4–8 for the purpose of monitoring one or more fixed points on each tooth profile around the peripheries of the respective gears 23 and 24 of the pair forming the coupling 19. Corresponding elements of FIGS. 4 and 9 have been given corresponding reference numerals. A pair of circular standards 119 and 120 (which may be made of quartz) are attached to the reference and test shafts 21 and 22, respectively, in place of the standards 59 and 61 of FIG. 4. The standards 119 and 120 of FIG. 9 are each provided with T×K equally spaced graduations, where T is the number of teeth on the associated gear and K is the number of points to be checked per tooth. Thus, assuming that one point on each tooth is to be checked, the angular spacing between graduations on the standard 119 is $360°/T_1$ and the angular spacing between graduations on the standard 120 is $360°/T_2$, where $T_1$ and $T_2$ are the number of teeth on the test and reference gears 24 and 23, respectively.

The embodiment of FIG. 9 differs from that shown in FIG 4 in that in the latter both of the corresponding standards 59 and 61 are provided with equal numbers of equally spaced graduations, irrespective of the angular speed ratio between the input and output of the rotational coupling 19. The embodiment of FIG. 9 also differs from that of FIG. 4 in that the shaft 43 has been eliminated and a gear train 121 (FIG. 9) of different ratio than the first gear train 28 (FIG. 4) has been substituted for the latter for the purpose of coupling the reference shaft 21 to the shaft 27. The gear ratio of the train 121 (FIG. 9) is selected, as before, to provide an integral number of revolutions of the shaft 27 between successive graduations on the standard 119.

It is important to note that while it has been assumed that only one point per tooth is to be checked on each of the gears 23 and 24, the number of monitoring points per tooth may also be fixed at 2, 4, 5, 10, 20, 25, 40, 50, 100 or 200 without violating the requirement that an integral number of revolutions of the shaft 27 take place between successive graduations on the standards 119 and 120, respectively.

The output of the shaft 22 is coupled to the input of an optically excited sweep generator 122, which may be identical to the generators 88 and 96 of FIG. 4. The output of the generator 122 (FIG. 9) is coupled directly to the first and second horizontal inputs 89 and 97 of the oscilloscope 86. The output of the generator 122 is also coupled to the first and second vertical inputs 91 and 98 of the oscilloscope 86 through a trigger generator 123 and a staircase generator 124, which may be respectively identical to the corresponding components of FIG. 4. The outputs of the record control circuits 77 and 78 are respectively applied to the first and second Z-axis inputs 94 and 102 of the oscilloscope 86, as before. The operation of the embodiment shown in FIG. 9 is substantially identical to that of FIGS. 4-8.

Figure 10:
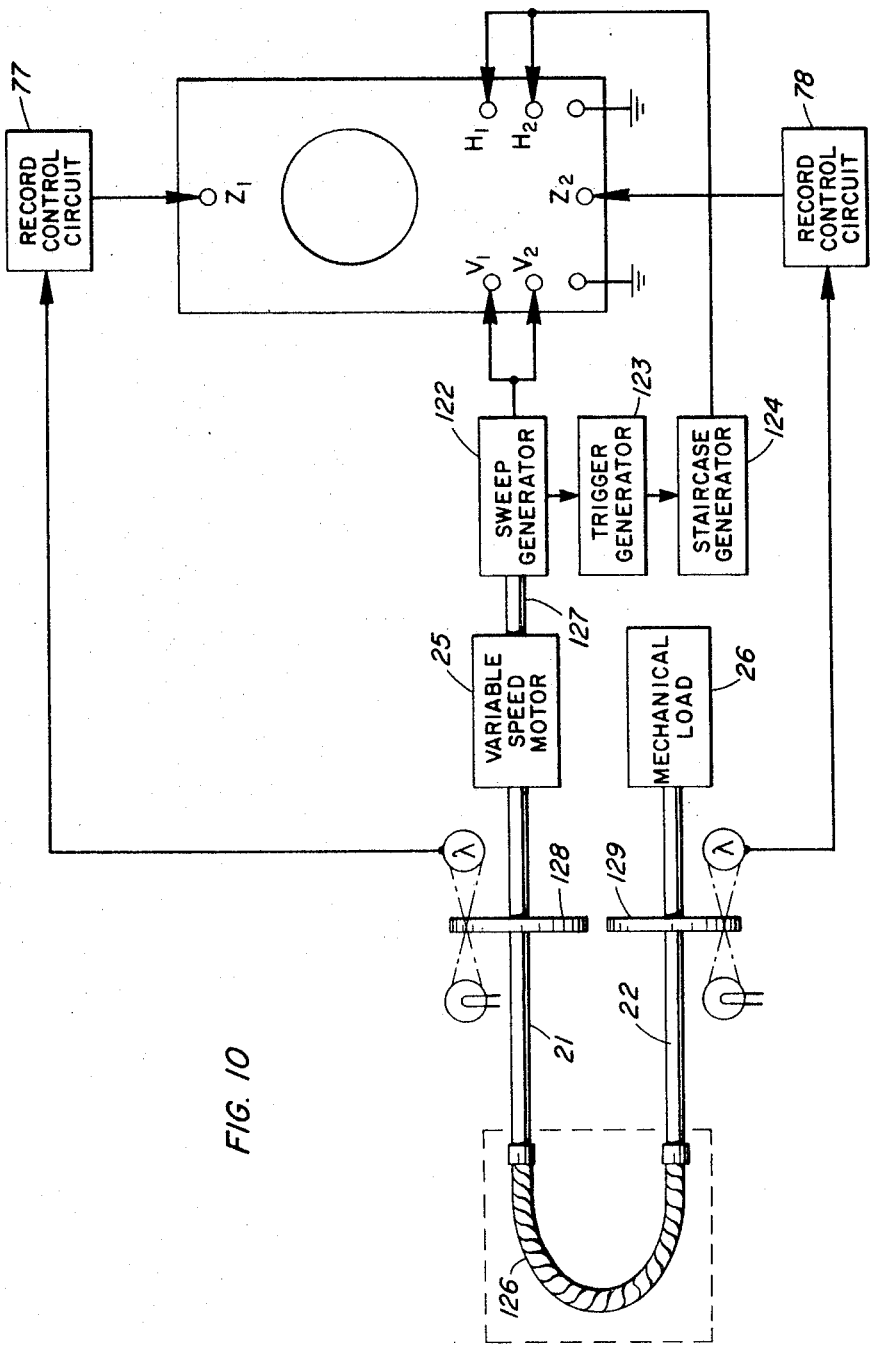
FIG. 10 is a diagrammatic representation of a simplified form of the arrangement of FIG. 9.

FIG. 10 depicts a simplified form of the arrangement of FIG. 9 suitable for use in the testing of 1:1 rotational couplings, such as flexible couplings, electrical links used to position synchros, and the like. Corresponding elements in FIGS. 9 and 10 have been given like reference numerals. Illustratively, a flexible coupling 126 interconnects the reference shaft 21 and the test shaft 22. Because the effective angular speed ratio of the coupling 126 is unity, the reference and test shafts 21 and 22 rotate at the same angular speed. In this case, the shaft 43 (FIG. 4) may be eliminated as in the embodiment of FIG. 9. Also, the shaft 27 of FIG. 9 may be replaced in FIG. 10 of the extension 127 of the reference shaft 21, thereby eliminating the gear train 121. Finally, a pair of standards 128 and 129 associated with the shafts 21 and 22 may have identical numbers of equally spaced graduations thereon. The remaining portions of FIG. 10 and its operation are substantially identical to those of FIG. 9.

What is claimed is:

1. In a system for ascertaining the effective transmission of motion through a coupling that ideally has a desired motion-changing characteristic:
    means for applying a predetermined input motion to the coupling to produce output motion in accordance with the actual motion-changing characteristic of the coupling;
    means rendered effective upon successive impartations of a predetermined increment of input motion for generating a first train of pulses;
    means rendered effective upon successive impartations of an increment of output motion related to each predetermined increment of input motion by the actual motion-changing characteristics of the coupling for generating a second train of pulses;
    first means responsive to the input motion and the first train of pulses for producing a first pattern having a configuration indicative of the input motion;
    a motion translating device driven by the input motion-applying means and having a fixed motion-changing characteristic corresponding to the desired motion-changing characteristics of the coupling; and
    second means responsive to the output of the motion-translating device and the second train of pulses for producing a second pattern having a configuration indicative of the actual output motion.

2. A system as defined in claim 1, in which the first and second patterns are visual displays.

3. In a system for monitoring the angular accuracy of a rotational coupling which ideally provides a desired angular speed ratio between the movement of an input member and an output member respectively coupled thereto:
    means for rotating the input member at a first angular speed to effect the rotation of the output member;
    first and second beams of radiation;
    first means associated with the input member for interrupting the first beam upon each movement of the input member through a first predetermined angular increment;
    second means associated with the output member for interrupting the second beam upon each movement of the output member through a second angular increment related to the first predetermined increment by the actual angular speed ratio of the coupling;
    first and second pressure sensitive tape means;
    first and second helical anvils respectively mounted for rotation adjacent the tape means;
    means for individually rotating the anvils at relative angular rates whose ratio corresponds to the desired angular speed ratio; and
    first and second printer bars respectively mounted for reciprocation opposite the first and second tapes and actuated in response to the interruption of the respective first and second beams for pressing the adjacent portions of the respective tape means into engagement with the associated anvils to define a first and second pattern, the conformity of the patterns being indicative of the angular accuracy of the rotational coupling.

4. In a system for monitoring the angular accuracy of a rotational coupling which ideally provides a desired angular speed ratio between the movement of an input member and an output member respectively coupled thereto:
    means for rotating the input member at a first angular speed to effect the rotation of the output member;
    first and second beams of radiation;
    first means associated with the input member for interrupting the first beam of radiation upon each movement of the input member through a first predetermined angular increment;
    second means associated with the output member for interrupting the second beam of radiation upon each movement of the output member through a second angular increment related to the first predetermined increment by the actual angular speed ratio of the coupling;
    a substantially planar display screen;
    means for generating first and second beams of electrons;
    first means for sweeping the first and second electron beams in timed relation across the screen in a first direction at relative angular rates whose ratio corresponds to the desired angular speed ratio;
    second means, operative in timed relation to the first sweeping means, for sweeping the first and second electron beams across the screen in a direction perpendicular to the first direction; and
    means for individually intensity-modulating the first and second swept electron beams when the first and second beams of radiation are so interrupted to form a respective first and second pattern on the screen, the conformity of the patterns being indicative of the angular accuracy of the rotational coupling.

5. Apparatus as defined in claim 3, in which the anvil-rotating means drives the first anvil through an integral number of cycles of rotation between successive interruptions of the first beam of radiation.

6. Apparatus as defined in claim 3 or 4, wherein the means for interrupting the first and second beams comprise first and second circular standards respectively carried by the input and output members, each standard having a plurality of transparent sectors disposed at equiangular intervals around the periphery thereof and separated by a plurality of opaque radial graduations.

7. Apparatus according to claim 6, in which the relative numbers of graduations on the respective standards are inversely proportional to the desired relative angular speeds of the associated members.

8. Apparatus as defined in claim 6, in which the first and second standards are provided with the same number of graduations.

(References on following page)

References Cited

UNITED STATES PATENTS

| | | | |
|---|---|---|---|
| 2,043,800 | 6/1936 | Karolus | 250—233 X |
| 2,289,551 | 7/1942 | Reason | 250—233 X |
| 3,054,902 | 9/1962 | Timms et al. | 250—220 X |
| 3,064,809 | 11/1962 | Anthony et al. | 73—162 X |
| 3,274,391 | 9/1966 | Heinz | 250—224 X |
| 3,381,288 | 4/1968 | Van Vlodrop. | |

FOREIGN PATENTS 278,627  2/1952  Switzerland.

RALPH G. NILSON, Primary Examiner

C. M. LEEDOM, Assistant Examiner

U.S. Cl. X.R.

73—162; 250—219, 233